US008340789B2

(12) United States Patent
Wintrich et al.

(10) Patent No.: US 8,340,789 B2
(45) Date of Patent: Dec. 25, 2012

(54) SYSTEM FOR MONITORING AND OPTIMIZING CONTROLLERS FOR PROCESS PERFORMANCE

(75) Inventors: Franz Wintrich, Essen (DE); Volker Stephan, Hupstedt (DE); Erik Schaffernicht, Ilmenau (DE); Florian Steege, Erfurt (DE)

(73) Assignee: Powitec Intelligent Technologies GmbH, Essen (DE)

(*) Notice: Subject to any disclaimer, the term of this patent is extended or adjusted under 35 U.S.C. 154(b) by 0 days.

(21) Appl. No.: 13/279,012

(22) Filed: Oct. 21, 2011

(65) Prior Publication Data

US 2012/0065746 A1 Mar. 15, 2012

Related U.S. Application Data

(63) Continuation of application No. PCT/EP2010/001969, filed on Mar. 29, 2010.

(30) Foreign Application Priority Data

Apr. 22, 2009 (EP) .................................... 09005626

(51) Int. Cl.
*G05B 13/02* (2006.01)

(52) U.S. Cl. ................ 700/48; 700/47; 700/28; 706/12; 706/14; 706/15; 706/30

(58) Field of Classification Search .................... 700/48, 700/28, 47; 706/12, 14, 15, 30
See application file for complete search history.

(56) References Cited

U.S. PATENT DOCUMENTS

| | | | | |
|---|---|---|---|---|
| 5,357,421 A | | 10/1994 | Tautz et al. | |
| 5,465,321 A | * | 11/1995 | Smyth | 706/20 |
| 5,479,571 A | * | 12/1995 | Parlos et al. | 706/25 |
| 5,649,065 A | * | 7/1997 | Lo et al. | 706/22 |

(Continued)

FOREIGN PATENT DOCUMENTS

DE 3024275 1/1982

(Continued)

OTHER PUBLICATIONS

Huang, Y.F., and Saskatchewan, R., "Development of Environmental Modeling Methodologies for Supporting System Simulation, Optimization and Process Control in Petroleum Waste Management", 2004, Ph.D. thesis in Department of Engineering at University of Regina.*

(Continued)

*Primary Examiner* — Mohammad Ali
*Assistant Examiner* — Kelvin Booker
(74) *Attorney, Agent, or Firm* — Womble Carlyle Sandridge & Rice, LLP

(57) ABSTRACT

A control system (1) for a complex process, particularly for controlling a combustion process in a power plant, a waste incinerator plant, or a cement plant, has a controlled system (14) and at least one controller (36), wherein the control system (1) is divided hierarchically into various levels (10, 20, 30, 40). The first level (10) represents the complex, real process to be controlled and is implemented by the controlled system (14). The second level (20) represents an interface to the process and is implemented by a process control system. The third level (30) represents the control of the process and is implemented by the at least one active controller (36). The fourth level (40) represents a superordinate overview and is implemented by a principal controller (44).

16 Claims, 5 Drawing Sheets

U.S. PATENT DOCUMENTS 5,671,335 A * 9/1997 Davis et al. .................... 706/25
5,732,382 A * 3/1998 Puskorius et al. ............ 701/110
5,745,653 A * 4/1998 Jesion et al. .................... 706/23
5,790,757 A * 8/1998 Meijer ............................ 706/45
5,825,646 A * 10/1998 Keeler et al. .................... 700/44
5,857,321 A * 1/1999 Rajamani et al. ............ 60/39.27
5,877,954 A * 3/1999 Klimasauskas et al. ........ 700/29
5,946,673 A * 8/1999 Francone et al. ............... 706/13
5,956,703 A * 9/1999 Turner et al. .................... 706/27
6,092,017 A * 7/2000 Ishida et al. .................. 701/106
6,169,981 B1 * 1/2001 Werbos ........................... 706/23
6,199,057 B1 * 3/2001 Tawel ............................. 706/30
6,216,048 B1 * 4/2001 Keeler et al. .................... 700/44
6,278,962 B1 * 8/2001 Klimasauskas et al. ........ 703/13
6,404,581 B1 * 6/2002 Shah .............................. 360/75
6,415,276 B1 * 7/2002 Heger et al. ..................... 706/52
6,493,686 B1 * 12/2002 Francone et al. ............... 706/12
6,532,454 B1 * 3/2003 Werbos ........................... 706/14
6,581,048 B1 * 6/2003 Werbos ........................... 706/23
6,882,992 B1 * 4/2005 Werbos ........................... 706/48
6,904,335 B2 * 6/2005 Solomon ....................... 700/247
7,024,335 B1 * 4/2006 Parlos ........................... 702/182
7,035,717 B2 * 4/2006 Wintrich et al. .............. 700/274
7,123,971 B2 * 10/2006 Piche ............................. 700/19
7,231,078 B2 * 6/2007 Wintrich et al. .............. 382/141
7,343,222 B2 * 3/2008 Solomon ....................... 700/245
7,520,744 B2 4/2009 Wintrich
7,610,252 B2 * 10/2009 Wintrich et al. ................ 706/45
7,624,082 B2 * 11/2009 Wintrich et al. ................ 706/45
7,664,593 B2 * 2/2010 Barillon et al. ............... 701/106
8,019,446 B2 * 9/2011 Wintrich et al. ................ 700/29
8,112,176 B2 * 2/2012 Solomon ....................... 700/245
2001/0025232 A1 * 9/2001 Klimasauskas et al. ........ 703/13
2004/0044423 A1 * 3/2004 Wintrich et al. ................ 700/29
2004/0162638 A1 * 8/2004 Solomon ....................... 700/247
2005/0137995 A1 6/2005 Wintrich et al.
2005/0251291 A1 * 11/2005 Solomon ....................... 700/245
2008/0046391 A1 * 2/2008 Wintrich et al. ................ 706/23
2008/0081302 A1 * 4/2008 Wintrich et al. .............. 700/274
2008/0215165 A1 * 9/2008 Wintrich et al. ................ 700/29
2009/0105852 A1 * 4/2009 Wintrich et al. ................ 700/29
2009/0182441 A1 7/2009 Wintrich et al.
2009/0234514 A1 9/2009 Becker et al.
2010/0049339 A1 * 2/2010 Schafer et al. .................. 700/31

FOREIGN PATENT DOCUMENTS

EP 0 777 881 5/1998
WO WO 02/070953 9/2002

OTHER PUBLICATIONS

Slanvetpaw, T., "Process Control of a Laboratory Combuster Using Neural Networks", May 2002, Ph.D. thesis in Department of Chemical Engineering at New Jersey Institute of Technology.*

Röscheisen, et al.; *Neural Control for Rolling Mills: Incorporating Domain Theories to Overcome Data Deficiency*; Jan. 1, 1993; pp. 1-8 (XP007914225).

Khare, et al.; *Co-evolutionary Modular Neural Networks for Automatic Problem Decomposition*; Evolutionary Computation; The 2005 IEEE Congress in Edinburgh, Scotland; Sep. 2-5, 2005; IEEE; pp. 2691-2698; vol. 3 (XP10861726).

International Search Report for International Application No. PCT/EP2010/001969.

* cited by examiner

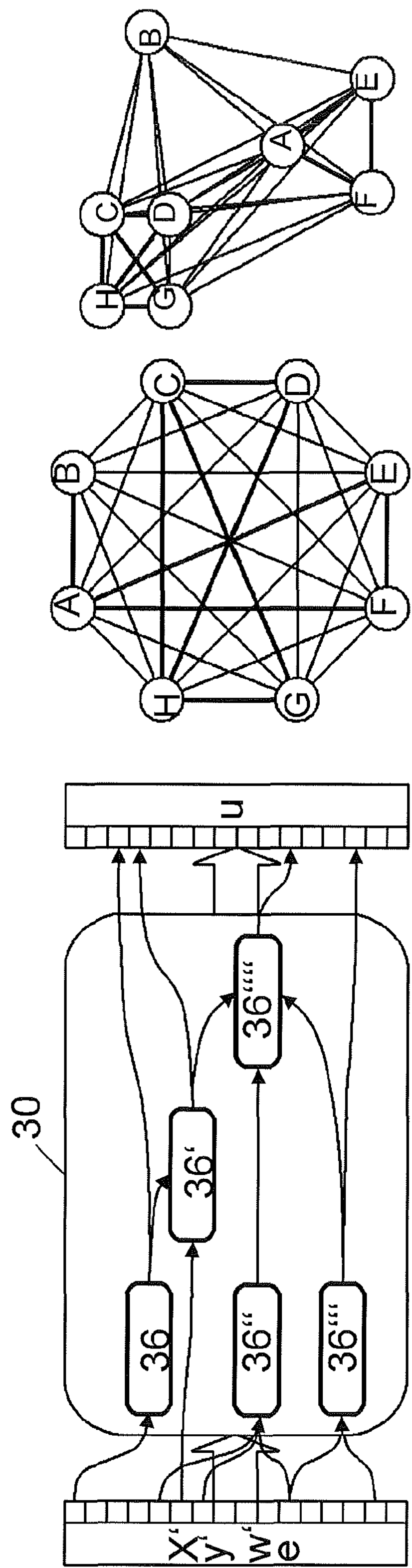
Fig. 4
Fig. 5A
Fig. 5B
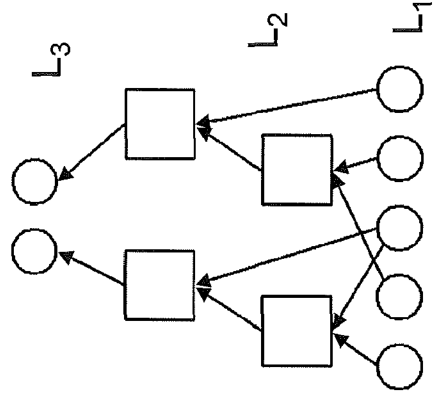
Fig. 7
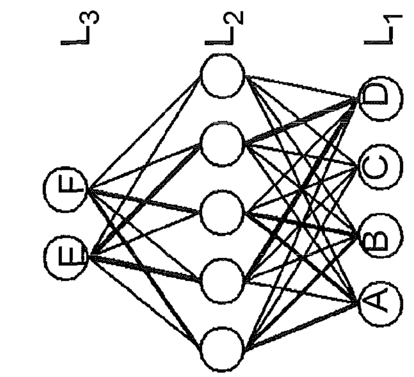
Fig. 8
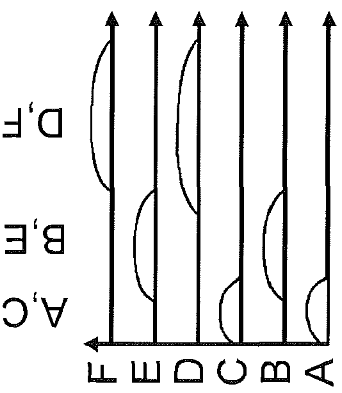
Fig. 6

SYSTEM FOR MONITORING AND OPTIMIZING CONTROLLERS FOR PROCESS PERFORMANCE

CROSS-REFERENCE TO RELATED APPLICATION

The present application is a continuation of International Application PCT/EP2010/001969, which was filed Mar. 29, 2010.

Incorporation By Reference

The entire disclosure of International Application PCT/EP2010/001969, which was filed Mar. 29, 2010, is incorporated herein by reference.

FIELD OF THE INVENTION

The present invention relates to for a control system for a complex process, such as, but not limited to, a combustion process in a power plant, a waste incineration installation or a cement works.

BACKGROUND

Complex real-world processes are distinguished by various properties which make control or optimization more difficult. The processes are, first of all, very complex solely on account of the number of available measured, controlled and manipulated variables. Furthermore, these processes are usually time-variant, i.e. external and internal influences (seasons, material qualities, operating states) give rise to relationships which change over time in the process data. A control system therefore needs to be adaptive and needs to be constantly adjusted.

In a control system which is known from EP 1 396 770 B1, process models of the controlled system (simulators) are developed in the background and trained. If the best new process model provides a higher level of accuracy for the forecasts than the process model used in the active controller, the latter is replaced by the best new process model, which gives rise to a new active controller. Then, the previously used process model and the other new process models are discarded.

BRIEF SUMMARY

An aspect of the present invention is the provision of improvements to a control system for a complex process. In one example, the control system comprises a process control system; a set of controllers comprising controllers which were previously active and at least one active controller; and a principal controller configured for training simulators that are for simulating the controlled system, developing the set of controllers, testing the set of controllers on the simulators in order to find a best controller, and comparing the best controller with the at least one active controller for determining whether to replace the at least one active controller with the best controller, wherein the control system is hierarchically split into a plurality of levels. The plurality of levels comprises a first level that is implemented by the controlled system and represents the complex, real process that is to be controlled; a second level that is realized by the process control system and represents an interface to the complex, real process that is to be controlled; a third level that is realized by the at least one active controller and represents control of the complex, real process that is to be controlled; and a fourth level that is realized by the principal controller and represents a superordinate supervisor.

The starting point is the complex, that is to say extremely nontrivial as a result of a wide variety of interactions, and relationships between cause and effect in the process. The hierarchic split of the control system into various levels allows better understanding of the process and optimized adaptation of the control system to suit the current state of the process.

Firstly, this allows active controllers to be adapted more quickly by virtue of the principal controller checking various controllers in the background and, in so doing, taking account of controllers which were active earlier. This prevents long retraining of the active controller from keeping the active controller from being unavailable until it can actually no longer be used on account of a change in the process. For the control, a recurrent neural network (or a plurality of interlinked networks) is preferably used which is trained using an evolutionary approach which, as an optimization criterion, minimizes the mean control error.

Given an appropriate operating period for the control system, a sufficiently large amount of data are available to provide sufficiently good simulators which simulate the controlled system with differently configured process models. When simulators are used, it is possible to test a set of old and new controllers before they are used on the controlled system. This prevents a fault in the ongoing operation of the control loop. The use of a plurality of simulators reduces errors and discrepancies from the real behavior of the controlled system and takes better account of different situations. An appropriately developed controller is therefore based on a plurality of process models. Preferably, a search is performed for that controller which best allows the setpoint values to be achieved. Retaining controllers which were active earlier facilitates the development of the best controller when particular states and time profiles recur. In addition, computation times and powers are saved. The training of the simulators and the development of a set of controllers are performed and monitored by a principal controller, preferably in particular cycles which are attuned to the dynamics of the controlled system. The control loop can be optimized by additional information, particularly image processing, and the optimizations are used in the simulators and/or in the development of the controllers and/or in the setpoint values, for example.

Secondly, the control can be split among various active controllers which have associated subprocesses in the complex process. The split of the control preferably changes dynamically by means of automatic problem decomposition. The principal controller analyzes the data space of the process and forms controllers for subareas which exhibit inherently stronger relationships.

Thirdly, if little process experience means that sparsely represented or totally unrepresented regions occur in the data space, these regions can be filled with artificial data points or demarcated.

The invention can be used for various static thermodynamic installations, particularly power plants, waste incineration installations and cement works. It is also conceivable for the control system according to the invention to be used in other technical fields. For example, the invention is not limited to thermal processes but rather can also be applied generally in mechanical or chemical process engineering, for example in refineries or dissociation furnaces. In principle, it is also possible for the remaining portion of the control system—when the feedback of the included control loop is absent or switched off—to be used for system identification and system description, i.e. for obtaining information.

BRIEF DESCRIPTION OF THE DRAWINGS

The invention is explained in more detail below with reference to an exemplary embodiment which is illustrated in the drawings, in which:

FIG. 4 is a schematic illustration of the split of the subareas of the control.

FIG. 5*a* is a schematic illustration of the mutual-information-based problem breakdown during calculation of the mutual information contents (mutual information).

FIG. 5*b* is a schematic illustration of the mutual-information-based problem breakdown during problem decomposition.

FIG. 6 is a schematic illustration of the dynamics-oriented problem breakdown.

FIG. 7 is a schematic illustration of the co-evolutionary bottom-up structure search.

FIG. 8 is a schematic illustration of the problem decomposition by network pruning.

DETAILED DESCRIPTION

Figure 1:
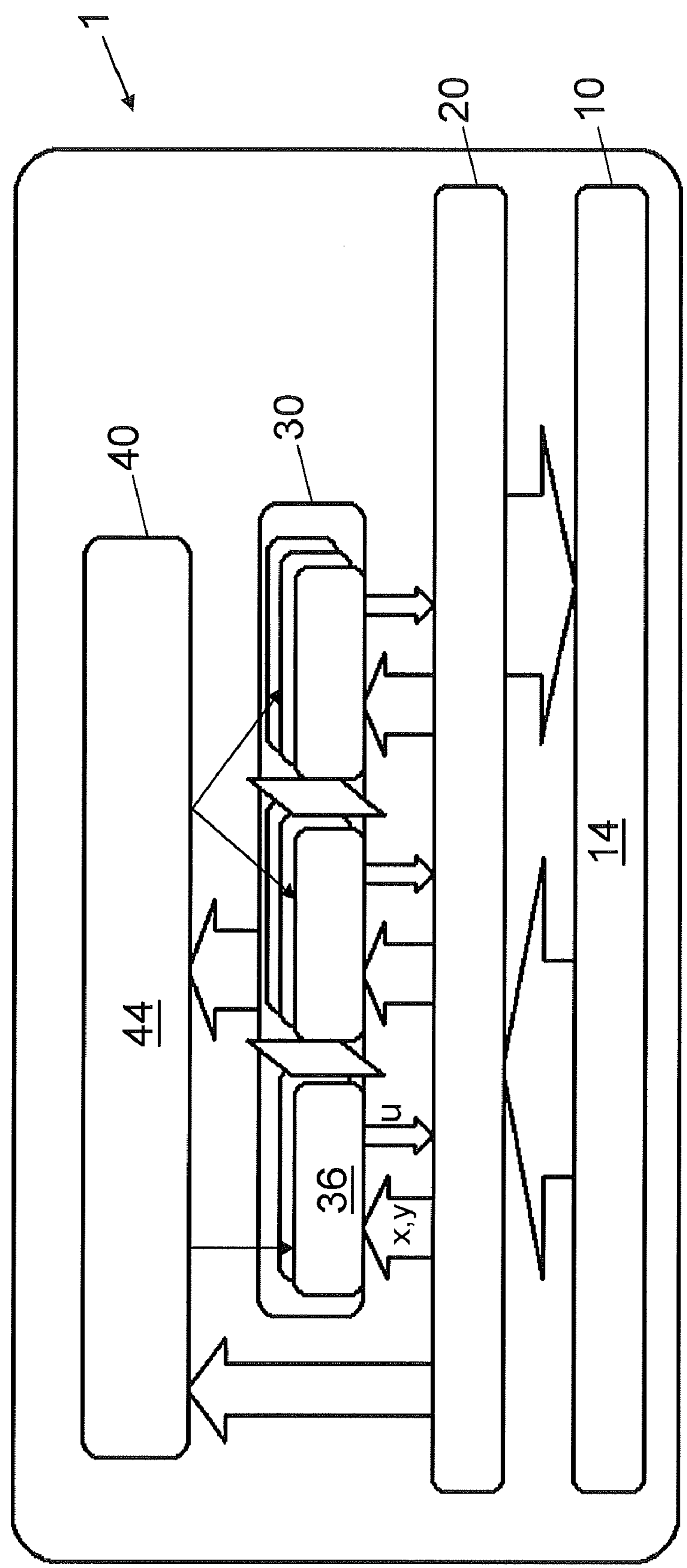
FIG. 1 is a schematic illustration of the hierarchic design of the control system.

A teachable, self-organizing, hierarchic control system 1 for managing and optimizing a complex processes is split into four different levels (FIG. 1) in order to at least approximately control the complex relationships between cause and effect on the various timescales.

The first level 10 represents the complex real process to be controlled and is implemented by a controlled system 14. The controlled system 14 preferably comprises a furnace (or a grate) in a coal, oil or gas power plant, in a waste incineration installation or in a cement works whose combustion process to be controlled is intended to be managed and optimized as a complex process. The controlled system 14 also comprises the associated control apparatuses, particularly for the supply of fuel or other material to be converted, for example coal, oil, gas, waste, lime or the like, and of primary air (or primary oxygen) and secondary air (or secondary oxygen). The controlled system 14 also comprises various measuring apparatuses, for example for emission parameters and the supply rates of the control apparatuses. At least one additional observation apparatus continuously captures the combustion process in the controlled system 14, particularly the flame body, graphically. The observation apparatus comprises not only an optical access penetrating the wall of the furnace, such as a lance or an apparatus as disclosed in EP 1 621 813 A1, but also a camera or the like which operates in the optical range or in adjacent ranges of electromagnetic waves. Preference is given to a camera with high time, local and spectral resolution, as described in WO 02/070953 A1, for example. The entire disclosure of each of EP 1 621 813 A1 and WO 02/070953 A1 is incorporated herein by reference.

The second level 20 represents an interface to the process and is realized by a process control system. The process control system actuates the control apparatuses by means of the (vectorial) manipulated variable u and queries the information from the various measuring apparatuses and from the at least one additional observation apparatus. The measurements from the various measuring apparatuses provide the (vectorial) actual value y, which (on the basis of time) describes the current state of the controlled system 14 (i.e. the state variables). The data from the additional observation apparatus, that is to say the images of the flame body and of the possible emissions from the walls of the furnace, are evaluated in a feature extractor 28 by means of image processing, for example on the basis of an Eigen value method as described in WO 2004/018940 A1 and/or by means of an information measure, as described in EP 1 967 792 A1. The entire disclosure of each of WO 2004/018940 A1 and EP 1 967 792 A1 is incorporated herein by reference. The feature extractor 28 then delivers the features x (in vectorially summarized form) ascertained therefrom. The second level 20 realized by the process control system provides the actual value y and the features x from the third level 30 and receives the manipulated variable u.

The third level 30 represents the management or control of various target variables for the process. On account of the complexity of the process, however, monolithic MIMO control is not possible from a technical and practical point of view. For this reason, the third level is preferably—in contrast to a monolithic controller—split into a plurality of smaller more easily realizable functional units which define subareas of the control and which are each realized by a separate system of controllers $\{\mathbf{36}, C_{36}C_i\}$, comprising an active controller 36 and possibly further, inactive controllers in a depot. Preferably, the controllers are implemented as, recurrent neural networks, since the actual value y, the features x and the manipulated variable u are linked to one another in complex fashion in terms of cause and effect. Each active controller 36 compares—for its area—the actual value y with a (vectorial) setpoint value w which describes the desired state of the controlled system 14. From the control error e, that is to say the (vectorial) difference between the actual value y and the setpoint value w, and preferably further information, the active controller 36 ascertains the (vectorial) manipulated variable u. The active controller 36 can provide control not only to obtain these setpoint values w but alternatively to obtain a stable process (i.e. smooth, virtually static operation of the controlled system 14) or to obtain a combination. The control actions to be performed using the manipulated variable u and also any faults can be handled together as actions (wanted and unwanted actions) which the second level 20 uses to act on the controlled system 14. The active controllers 36 operate in an adaptive fashion, i.e. they each use current data x, y in order to adjust their strategy to suit the current process circumstances. With the conversion of this third level 30, it is possible to manage the process on the basis of the target specifications, with the adaptivity ensuring that the active controllers 36 can adjust themselves to suit the current constraints of the process by means of retraining. A control loop is defined by the active controller 36 in the third level 30, the process control system in the second level 20 and the controlled system 14 in the first level 10.

The fourth level 40, which, in the present case, is realized by a principal controller 44, represents a superordinate supervisor which initiates various actions by observing the underlying levels 20 and 30. In this case, the levels 10, 20, 30, that is to say the actual control, also operate without any intervention by the fourth level 40, but not in optimum fashion. By way of example, the fourth level 40 continually observes the quality ("fitness") of the active controllers 36 and also the process characteristics. In the event of appropriately large discrepancies or alterations, copies of the active controllers 36 are produced and stored in the depot of the inactive controllers. The copies remaining in the depot are not adapted further and are available for later fresh use. However, the active controllers 36 are constantly adjusted further to suit the current process circumstances in the course of the adaptivity. In this way, the depot is filled with various inactive controllers which are each suitable for different process situations. The fourth level 40 then checks, by analyzing the current process characteristics or by means of offline tests in a suitable clock cycle, whether the depot does not contain a controller which would be better suited to the current process state than the currently operating, active controller 36. If this is the case, this hitherto inactive controller is activated and used and the hitherto active controller 36 becomes inactive and is stored in the depot. In this way, the control system 1 can create a memory of different states (of the controlled system 14) with the associated controller strategies and can retrieve said memory at any time. This means that one is not reliant on the limited speed of the adaptivity and it is possible to react to changes in the process much more quickly.

Besides the check on the suitability of controllers, a further task of the fourth level 40 is to find and activate suitable parameters for the controllers in the third level 30 by means of process observation. The process knowledge required for this purpose is firstly introduced in the form of known expert knowledge originally and secondly complemented by first-hand active process experience. As the duration of the process increases, process experience grows and finally dominates the process knowledge. Using the process knowledge, the fourth level 40 can now define suitable setpoint values or operating ranges for the controllers in the third level 30, for example, and manage the process in the way in which it works best on the basis of the available process knowledge. Ultimately, the principal controller 44 in the fourth level 40, the active controllers 36 in the third level 30, the process control system in the second level 20 and the controlled system 14 in the first level 10 define a complex control loop, i.e. a plurality of control loops coupled to one another.

Some aspects of the control system 1 are now described in more detail below. One subaspect is the checking of controllers, which will now be explained with reference to a subarea with a controller 36. The principal controller 44 manages not only the depot with the controllers but also a plurality of simulators $S_1, S_2, \ldots, S_n$, which each present a (process) model of the controlled system 14 and simulate the latter. The simulators $S_1, S_2, \ldots, S_n$ are based on—particularly in respect of different situations—differently configured models for the (combustion) process of the controlled system 14. The simulators $S_1, S_2, \ldots, S_n$ are preferably implemented as recurrent neural networks. It is possible to add or remove further simulators $S_i$ at any time. Right at the beginning, when there is not yet any process experience, the principal controller 44 manages only a few simulators $S_1, S_2, \ldots, S_n$, for example a single simulator $S_1$, which are based solely on the expert knowledge as the only process knowledge. As process experience increases, the principal controller 44 then preferably creates further simulators $S_1, S_2, \ldots, S_n$.

Figure 2:
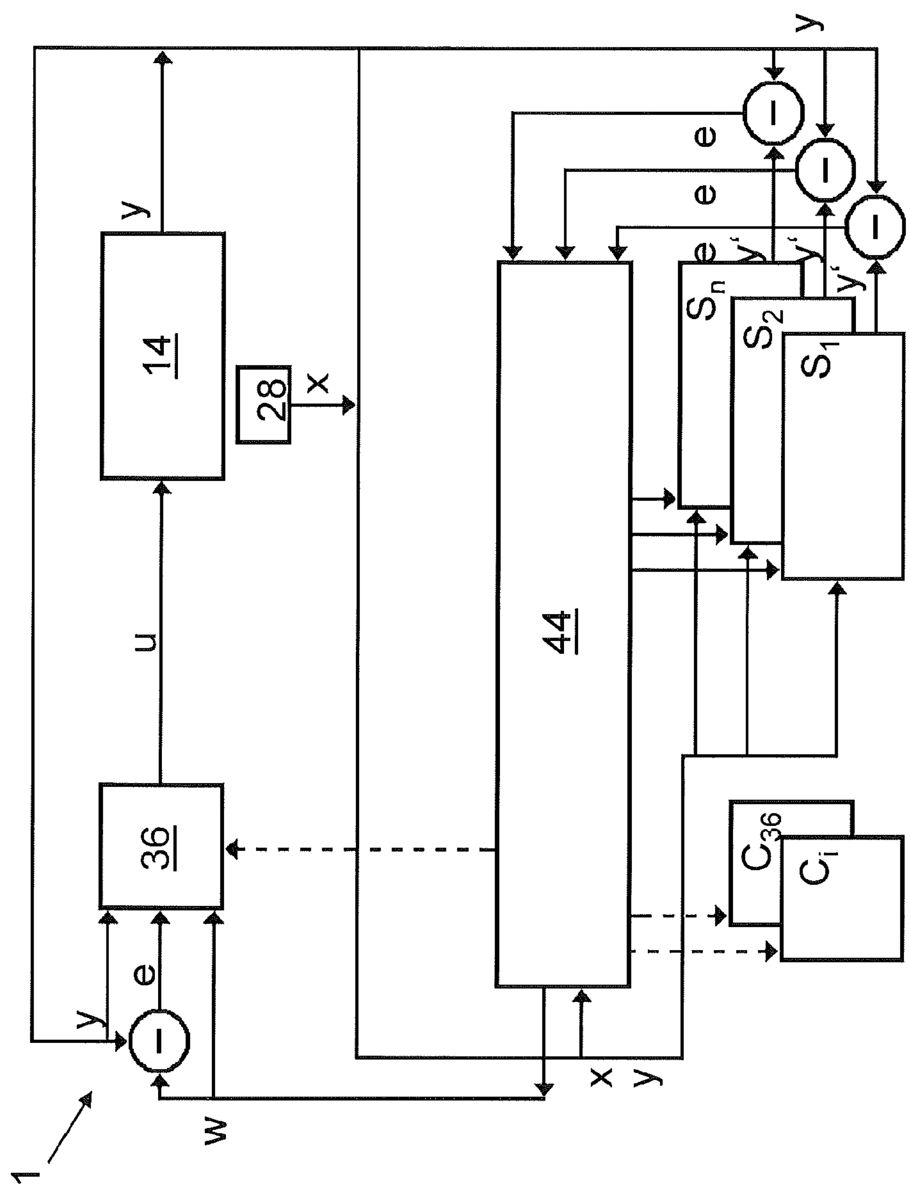
FIG. 2 is a schematic illustration of the control system during training of the simulators.

First, the principal controller 44 trains (FIG. 2) the individual simulators $S_1, S_2, \ldots, S_n$ in evolutionary fashion by virtue of the discrepancy in the forecast y' for the actual value y from the real actual value y defining a "fitness" which needs to be optimized in each case. In this case, the simulators $S_1, S_2, \ldots, S_n$ are provided not only with the real actual value y but also with the further features x. In the case of this evolutionary approach, simulators $S_1, S_2, \ldots, S_n$ which achieve only low fitness are rejected again by the principal controller 44. Once all the simulators $S_1, S_2, \ldots, S_n$ have been trained adequately, they can approximate the behavior of the controlled system 14 for different profiles of the manipulated variables u. On the basis of the different configuration, it can be assumed that not all the simulators $S_1, S_2, \ldots, S_n$ make the same error, but rather that the total number of the simulators $S_1, S_2, \ldots, S_n$ represents a better model of the controlled system 14 than any single simulator $S_i$.

Figure 3:
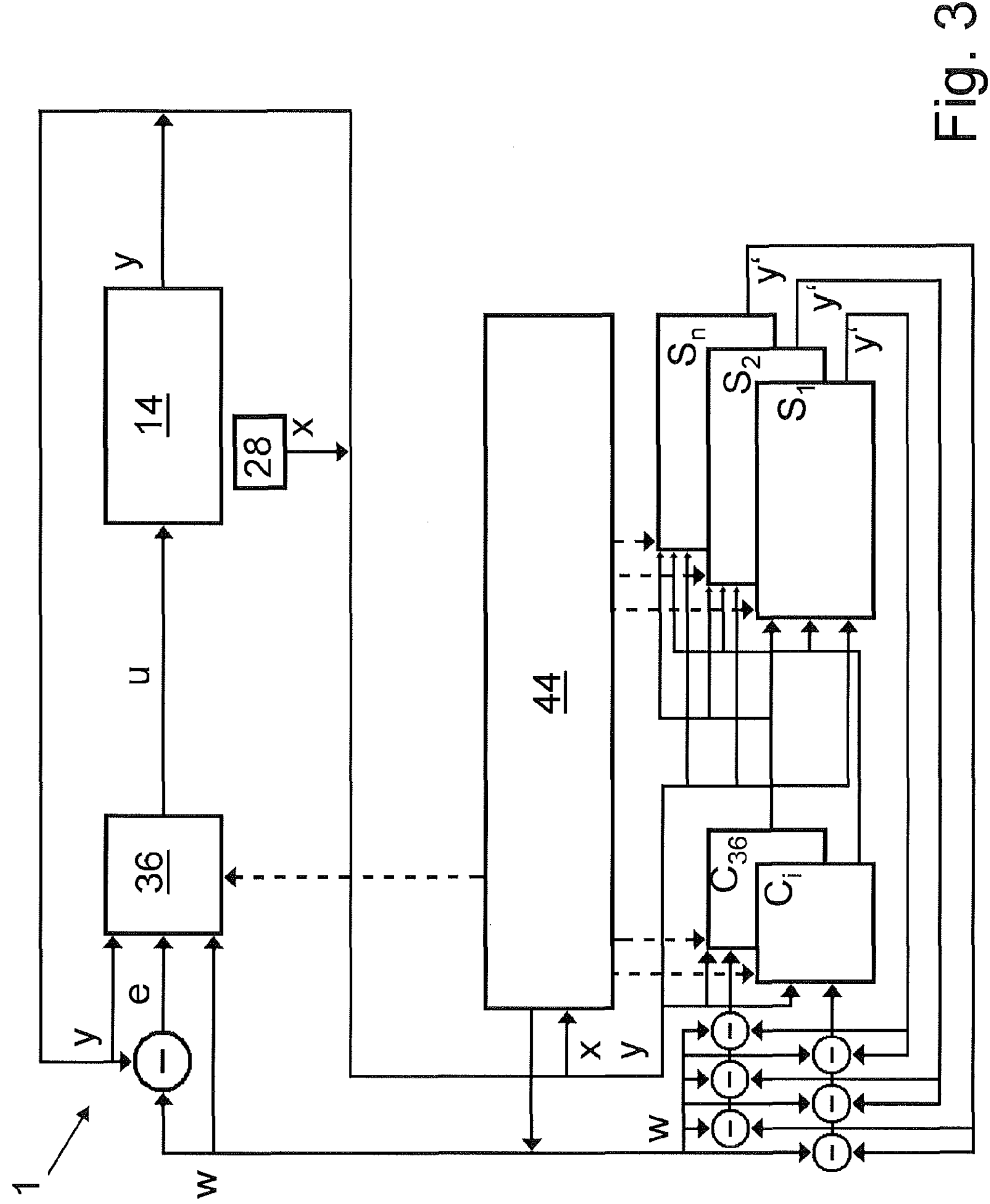
FIG. 3 is a schematic illustration of the control system during development of the set of controllers.

The principal controller 44 now develops (FIG. 3) a set of (inactive) controllers $\{C_i, C_{36}\}$, comprising new controllers $C_i$, which are subjected to evolutionary search strategies (that is to say elements from this set which are created by the principal controller 44 and which are rejected by it again if their fitness is too low), and comprising all the controllers $C_{36}$ which were active controllers 36 earlier and which are exempt from the evolutionary search strategies for new controllers $C_i$. Right at the start, when there is not yet any process experience, or when the split of the control between the active controllers 36, 36', 36", 36'", 36"" has been changed, there will not yet be any such controllers $C_{36}$ which were active controllers 36 earlier. The principal controller 10 tests the set of controllers $\{C_i, C_{36}\}$ on the simulators $S_1, S_2, \ldots, S_n$. A search is performed for that controller $C_i$ or $C_{36}$ which, on average over all the simulators $S_1, S_2, \ldots, S_n$ used, best matches the forecasts y' of the latter in the time profile to the profiles of the setpoint values w (i.e. that controller which can best be used to achieve the setpoint values w). The "fitness" of such a controller $C_i$ or $C_{36}$ is therefore obtained from the (simulated) control errors e of the controller $C_i$ or $C_{36}$ in closed control loops on all the simulators $S_1, S_2 \ldots, S_n$. In this case too, the features x are taken into account. The controller $C_i$ or $C_{36}$ found in this manner shall be called the best controller $C_1$. Since the various simulators $S_1, S_2, \ldots, S_n$ are based on different process models and the best controller $C_1$ on average over all the simulators $S_1, S_2, \ldots, S_n$ used has been found, the best controller $C_1$ contains characteristics of different process models.

The best (inactive) controller $C_1$ is now compared with the controller 36 which is active in the third level 30 by the principal controller 44, for example in respect of the average control error e. Depending on the evolution of the state of the controlled system 14 over time (i.e. depending on the process situation and the process history), it may be that the best controller $C_1$ is also better than the active controller 36. The principal controller 44 then replaces the active controller 36 with the best controller $C_1$. The hitherto active controller 36 returns to the set of inactive controllers $\{C_i, C_{36}\}$. If, at some time, a state of the controlled system 14 is again reached for which the controller $C_{36}$ which was active earlier was already good, it would also obtain a very good "fitness" in the test on the simulators $S_1, S_2, \ldots, S_n$ and become the active controller 36 again.

The principal controller 44 performs the training (FIG. 2) of the simulators $S_1, S_2, \ldots, S_n$ and the testing (FIG. 3) of the set of controllers $\{C_i, C_{36}\}$ in particular cycles using the respective current actual value y (and the current features x), for example every eight hours, in order to obtain an active controller 36 which is adapted to suit the medium-term changes in the state of the controlled system 14 over time. By contrast, control systems with only one (active) controller have the drawback that in the event of a relatively large change in the process the retraining of the controller becomes too time consuming.

A further subaspect is the definition of the subareas of the control and split among the active controllers 36, 36', 36", 36'", 36"". The subareas of the control are associated with relatively small and more easily controllable and modelable subprocesses in the complex process (FIG. 4). The split is preferably not static but rather changes dynamically by means of automatic problem decomposition (APD). To this end, the teachable, self-organizing system for automatic problem decomposition (on the principal controller 44) analyzes the problem structure of the complex high dimensional process automatically and designs a suitable structure of controllers 36, 36', 36", 36'", 36"". In contrast to the monolithic controller, this design is distinguished by a higher level of transparency and efficiency and can be taught and adapted more quickly. This structuring of the process is performed using the available, most comprehensive and informative possible process data from a database in parallel by means of at least one, preferably all five, of the methods described below.

In the case of the mutual-information-based problem breakdown (FIG. 5A, FIG. 5B), the process is similar to that described for the aforementioned feature extractor 28 and in EP 1 967 792 A1. First of all, the mutual information contents (mutual information) are calculated between all the channels (x, y, u . . . ) available in the data record in pairs. The resultant values in this case are used as edge weights in a fully interconnected graph in which each channel has an associated node A, B, C, D, E, F, G, H (FIG. 5A). In a subsequent relaxation process, these edge weights exercise forces of attraction and repulsion, depending on strength, between the nodes A, B, C, D, E, F, G, H, so that the nodes can be displaced freely in a correspondingly highly dimensional space. The result of this relaxation process is then interpreted as problem decomposition, with the clusters A, E, F and also C, D, G, H and B formed from mutually dependent nodes corresponding to a subproblem in each case (FIG. 5B).

The dynamics-oriented problem breakdown (FIG. 6) uses the circumstance that in structured complex real processes not all the subprocesses are executed on the same time scale. In addition, all the signals (from the channels A, B, C, D, E, F) are first of all transformed from the time domain to the frequency domain and are then categorized into different subproblems on the basis of their spectra, so that channels with similar dynamics are respectively grouped into a subsystem A, C and also B, E and D, F.

In the case of the co-evolutionary bottom-up structure search (FIG. 7), in contrast to the previous methods, the complex overall system is modeled by combining numerous small functional units. This involves the use of co-evolutionary algorithms which produce a suitable combination of the subsystems using the mapping error from predefined target channels. The model structure found in this manner corresponds to the problem decomposition. By way of example, FIG. 7 shows, from bottom to top, the input layer $L_1$, two concealed layers $L_2$ with simple teachable approximators, and the output layer $L_3$. The concealed layers $L_2$ may be present in a different number.

The problem decomposition by means of reward decomposition first of all involves hypothetical problem breakdowns being constructed. Next, a method for automatic reward decomposition is used to solve the credit assignment problem in order to assess the quality of the hypothetical problem breakdown. This assessment is then used by a stochastic search method in order to find the optimum problem breakdowns.

Finally, the problem decomposition by means of network pruning (FIG. 8) first of all models the complex process using suitable adaptive function approximators, such as neural networks, in a similar manner to that described in EP 2 080 953 A1. By analyzing the internal model structure (strength of the weighting symbolized by line thickness), it is then possible to infer the underlying problem structure for the process. FIG. 8 shows, from bottom to top, the input layer $L_1$, the concealed layer $L_2$ and the output layer $L_3$.

Each of these methods provides a hypothesis for the problem breakdown. In a subsequent step, these decomposition proposals are compared with one another and a common solution is derived which performs the split into subareas and associates it with the controllers 36, 36', 36", 36'", 36"". This can be done using various approaches, such as automated majority decision. If the process has already been running for a relatively long time, that is to say that there is process experience, the automatic problem decomposition is usefully performed on a larger time scale than the check on the controllers by the principle controller 44 described above.

One subaspect is also the problem area that the process knowledge, which initially comprises only expert knowledge, is enriched only slowly by process experience, and the latter is not distributed evenly over the possible states (of the controlled system 14), i.e. in the data space of the process. Thus, appropriately informative data—in an uneven distribution—are available only for the normal operating range, but no or far too few data are available for the abnormal fault ranges. As a result, a controller is unable to learn a suitable strategy and will behave unpredictably in online mode. Therefore, an adaptive controller (NFQ) is proposed which is trained on the basis of the measured process data available in the data space and which involves artificial data points being introduced into the data space in order to prevent the controller from developing arbitrary strategies for regions with poor data support. Available expert knowledge can be explicitly integrated. The adaptive controller is also suitable for training on closed loop data records.

The adaptive controller is realized by a teachable neural multilayer network which is trained by a gradient-descent-based or evolutionary method. In this case, a plurality of input variables and a plurality of manipulated variables (MIMO system), simple SISO systems and also hybrid forms (MISO, SIMO) are possible. The adaptive controller is based on reinforcement learning and does not map the control strategy directly, but rather first of all ascertains the value (Value) of control actions in different process situations. The value of a control action is ascertained using a reward function defined by the operator. This reward function is the mathematical notation of the control target, e.g. minimum control error for a target variable $e=-abs(w-y)$. By comparing the values of different control actions in the same process situation, the controller can find out which strategy (policy) is better and can then also use this strategy in practice.

Figure 9:
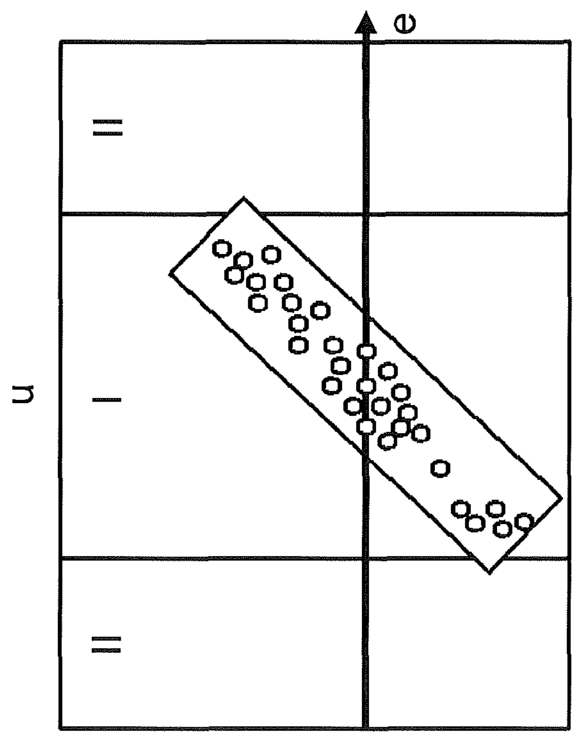
FIG. 9 is a schematic illustration of the incomplete data space.

The training of the controller is first of all based only on those measurements of various process variables which are available in the data space. Typically, the data space is not complete in a sense that firstly all conceivable process situations are included (rare faults or exceptional situations are usually missing). Secondly, not all process situations will normally contain all the possible control actions either, since these industrial processes are usually controlled. The drawing (FIG. 9) illustrates the two categories of missing data for a simple SISO case with a manipulated variable u and an input variable e. As can be seen in this case, the available measurement data (circles in FIG. 9 and FIG. 10) in the data space area I with known process situations (i.e. available process knowledge) are not distributed equally well. This can result in problems during training, since underrepresented regions of the data space are also taken into account less during the training process. In order to minimize this effect, artificial data points are inserted into these sparsely occupied regions of the data space (rectangles in FIG. 9). Histogram equalization for the training data is therefore performed in all known regions of the data space.

Figure 10:
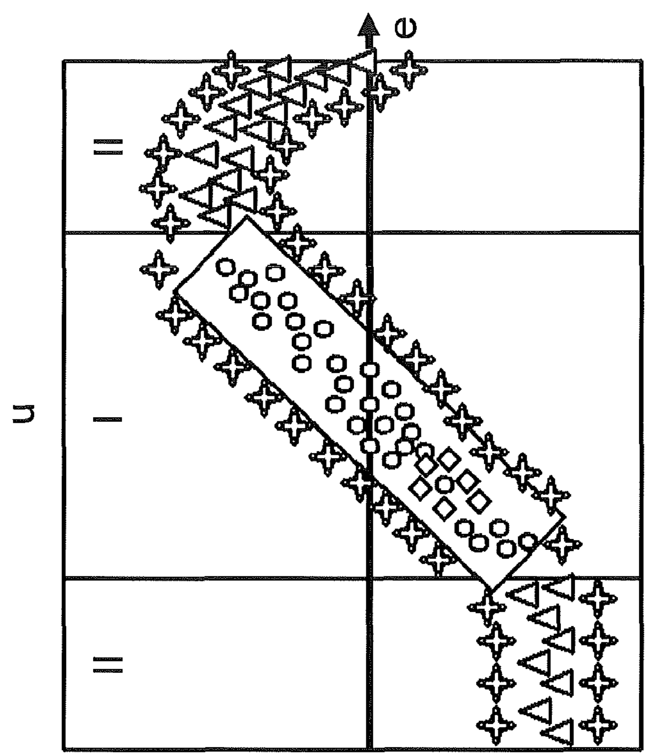
FIG. 10 is a schematic illustration of the data space with artificial data points.

In order to ensure that no undesirable extrapolations of the controller behavior occur in the unknown regions, artificial data are now also inserted therein. This is done firstly in the region of untested control actions in the data space area I with known process situations (crosses in data space area I in FIG. 10). These data points are provided with a low value as the data points which are really experienced, and therefore prevent the action strategy in areas without real process experience from drifting away, i.e. they demarcate the region. In the data space areas II with totally unknown process situations, artificial data points are likewise inserted (triangles and crosses in data space area II in FIG. 10). In this case, the triangles in FIG. 10 represent the available expert knowledge and the crosses with a relatively low value prevent unwanted extrapolations, i.e. they likewise demarcate these regions.

In this way, it is possible to ensure that the adaptive controller is also used in regions which are supported by real experience. In hitherto unexplored regions, the controller is reliant on the instilled expert knowledge. When real process experience is obtained during ongoing operation with the controller, it is quite normally incorporated into the training and increasingly dominates the expert knowledge. This ensures that real process experience also becomes prevalent over expert knowledge in time.

It will be understood by those skilled in the art that while the present invention has been discussed above with reference to an exemplary embodiment, various additions, modifications and changes can be made thereto without departing from the spirit and scope of the invention as set forth in the following claims.

What is claimed is:

1. A control system for controlling a complex, real process of a controlled system, comprising:

a process control system;

a set of controllers comprising controllers which were previously active, and at least one active controller;

a principal controller configured for training simulators that are for simulating the controlled system, developing the set of controllers, testing the set of controllers on the simulators in order to find a best controller, and comparing the best controller with the at least one active controller for determining whether to replace the active controller with the best controller, wherein the principal controller is configured:

for individually training the simulators in evolutionary fashion using a recurrent neural network; and so that, for each of the simulators, the training comprises defining a fitness for being optimized, and the defining of the fitness comprises determining a discrepancy in a forecast value from an actual value, wherein the control system is hierarchically split into a plurality of levels comprising:

a first level that is implemented by the controlled system and represents the complex, real process that is to be controlled, a second level that is realized by the process control system and represents an interface to the complex, real process that is to be controlled, a third level that is realized by the at least one active controller and represents control of the complex, real process that is to be controlled, and a fourth level that is realized by the principal controller and represents a superordinate supervisor.

2. The control system as claimed in claim 1, wherein the at least one active controller is based on a recurrent neural network.

3. The control system as claimed in claim 1, comprising a feature extractor configured for:

performing image processing for the controlled system, and ascertaining features from the image processing.

4. The control system as claimed in claim 1, wherein the at least one active controller is configured for ascertaining a manipulated variable using control error between an actual value (y) from the controlled system and a setpoint value.

5. The control system as claimed in claim 1, wherein the principal controller is configured:

for searching for new controllers in the set of controllers; and so that the controllers which were previously active are excluded from the searching for the new controllers.

6. The control system as claimed in claim 1, wherein the principal controller is configured so that the testing of the set of controllers on the simulators comprises a search being performed to identify a controller which, on average over the simulators best matches the forecasts of the simulators in a time profile to profiles of setpoint values.

7. The control system as claimed in claim 6, wherein the principal controller is configured so that fitness of a controller from the set of controllers is obtained from simulated control errors of the controller in closed control loops on the simulators.

8. The control system as claimed in claim 1, wherein the principal controller is configured so that the controllers which were previously active are excluded from evolutionary search strategies for new controllers in the set of controllers.

9. The control system as claimed in claim 8, wherein the principal controller is configured so that the controllers which were previously active are excluded from the search.

10. The control system as claimed in claim 1, wherein:

the at least one active controller comprises a plurality 20 of active controllers; and the control in the third level is split among the plurality of active controllers into subareas which have associated subprocesses in the complex process.

11. The control system as claimed in claim 10, wherein the principal controller is configured so that the split of the control among the plurality of active controllers changes dynamically by way of automatic problem decomposition.

12. The control system as claimed claim 1, wherein artificial data points are inserted in a data space for the states of the controlled system in unoccupied or sparsely occupied regions.

13. The control system as claimed in claim 12, wherein artificial data points are also inserted in regions of untested control actions in the data space area with known 5 process situations and/or in data space areas with totally unknown process situations.

14. The control system as claimed in claim 1, wherein the complex, real process of the controlled system is a combustion process in a power plant, a waste incineration installation or a cement works.

15. The control system as claimed in claim 1, wherein the principal controller is configured:

for searching for new controllers in the set of controllers; and so that the controllers which were previously active are excluded from the searching for the new controllers.

16. The control system as claimed in claim 1, wherein the principal controller is configured for:

training the simulators in cycles, and testing the set of controllers on the simulators.

* * * * *

UNITED STATES PATENT AND TRADEMARK OFFICE

CERTIFICATE OF CORRECTION

PATENT NO. : 8,340,789 B2
APPLICATION NO. : 13/279012
DATED : December 25, 2012
INVENTOR(S) : Wintrich et al.

It is certified that error appears in the above-identified patent and that said Letters Patent is hereby corrected as shown below:

On Title page, Item (75) Inventors section, "Florian Steege" should read
--Frank-Florian Steege--.

In the Specifications:

Column 10, Claim 10, Line 44, delete "20".

Column 10, Claim 13, Line 60, delete "5".

Signed and Sealed this
Fourth Day of June, 2013

Teresa Stanek Rea
*Acting Director of the United States Patent and Trademark Office*